(12) United States Patent
Mandai

(10) Patent No.: US 11,759,900 B2
(45) Date of Patent: Sep. 19, 2023

(54) MACHINING APPARATUS FOR DIFFERENTIAL CASE

(71) Applicant: HARU Technique Laboratory Inc., Okayama (JP)

(72) Inventor: Haruo Mandai, Okayama (JP)

(73) Assignee: HARU TECHNIQUE LABORATORY INC., Okayama (JP)

( * ) Notice: Subject to any disclaimer, the term of this patent is extended or adjusted under 35 U.S.C. 154(b) by 83 days.

(21) Appl. No.: 16/969,018

(22) PCT Filed: May 1, 2018

(86) PCT No.: PCT/JP2018/017388
§ 371 (c)(1),
(2) Date: Aug. 11, 2020

(87) PCT Pub. No.: WO2019/211887
PCT Pub. Date: Nov. 7, 2019

(65) Prior Publication Data
US 2021/0039209 A1    Feb. 11, 2021

(51) Int. Cl.
*B23P 23/02* (2006.01)
*B23Q 3/155* (2006.01)
(Continued)

(52) U.S. Cl.
CPC .............. *B23P 23/02* (2013.01); *B23B 3/065* (2013.01); *B23Q 3/15513* (2013.01);
(Continued)

(58) Field of Classification Search
CPC ................ B23Q 39/027; B23Q 39/025; B23Q 2039/002; B23Q 2039/006;
(Continued)

(56) References Cited

U.S. PATENT DOCUMENTS 3,389,454 A    6/1968   Sattler
4,706,371 A * 11/1987   McMurtry ............... B23Q 7/04
                                                      483/66

(Continued)

FOREIGN PATENT DOCUMENTS

DE     102011013457 A1 * 9/2012
DE     102016001826 B3    12/2016
(Continued)

OTHER PUBLICATIONS

Machine Translation of JP 2004-255560-A, which JP '560 was published Sep. 2004.*

(Continued)

*Primary Examiner* — Erica E Cadugan
(74) *Attorney, Agent, or Firm* — Pearne & Gordon LLP

(57) ABSTRACT

A machining apparatus includes: a shuttle unit (3) that holds a differential case (10) and rotates the differential case (10); a pair of opposed right and left machining units (4); and a tool support (6) that supports a tool (40) for machining the differential case (10), in which the pair of right and left machining units (4) each include a slide mechanism dedicated for uniaxial sliding in right and left directions, the shuttle unit (3) is movable in up and down directions and front and back directions, a tool attached to each of the pair of right and left machining units (4) enables machining an end portion of an inner surface of the differential case (10) and a flange hole of the differential case (10), the end portion surrounding a through hole, and a cutting edge of the tool (Continued)

(40) supported by the tool support (6) enables spherically cutting the inner surface of the differential case (10) held and rotated by the shuttle unit (3).

9 Claims, 15 Drawing Sheets

(51) Int. Cl.
| | |
|---|---|
| *B23Q 3/157* | (2006.01) |
| *B23Q 7/04* | (2006.01) |
| *B23Q 39/02* | (2006.01) |
| *B23B 11/00* | (2006.01) |
| *B23B 39/22* | (2006.01) |
| *B23B 3/06* | (2006.01) |
| *B23B 5/40* | (2006.01) |
| *B23B 41/00* | (2006.01) |
| *B23Q 39/00* | (2006.01) |

(52) U.S. Cl.
CPC ..... *B23Q 3/15573* (2013.01); *B23Q 3/15713* (2013.01); *B23Q 7/047* (2013.01); *B23Q 39/025* (2013.01); B23Q 3/15506 (2013.01); B23Q 3/15706 (2013.01); B23Q 3/15722 (2016.11); B23Q 2003/15537 (2016.11); B23Q 2039/002 (2013.01); B23Q 2039/008 (2013.01); Y10T 29/5114 (2015.01); Y10T 483/1705 (2015.01); Y10T 483/1707 (2015.01); Y10T 483/1714 (2015.01); Y10T 483/1726 (2015.01)

(58) Field of Classification Search
CPC .............. B23Q 2039/008; B23Q 7/047; B23Q 39/00–39/048; Y10T 82/2511; Y10T 29/5109; Y10T 29/5114; B23B 3/10; B23B 3/065; B23B 3/162; B23B 3/165; B23B 3/168; B23B 11/00; B23B 2270/56; B23P 23/00–23/04
USPC .................................... 82/122; 29/27 R, 27 C
See application file for complete search history.

(56) References Cited

U.S. PATENT DOCUMENTS

| | | | | |
|---|---|---|---|---|
| 5,699,598 | A * | 12/1997 | Hessbruggen | B23Q 39/04 |
| | | | | 29/38 A |
| 5,781,983 | A * | 7/1998 | Gruner | B23Q 7/047 |
| | | | | 409/164 |
| 6,761,515 | B2 * | 7/2004 | Laur | B23Q 1/70 |
| | | | | 409/137 |
| 6,832,433 | B2 | 12/2004 | Kramer | |
| 2004/0226154 | A1 | 11/2004 | Walz | |
| 2022/0226909 | A1 * | 7/2022 | Mandai | B23B 35/00 |

FOREIGN PATENT DOCUMENTS

| | | |
|---|---|---|
| EP | 1 160 034 A2 | 12/2001 |
| EP | 1386691 A1 * | 2/2004 |
| GB | 2271945 A * | 5/1994 |
| JP | S63-120701 U | 8/1988 |
| JP | H03-026414 U | 3/1991 |
| JP | H07-9216 A | 1/1995 |
| JP | H11-151601 A | 6/1999 |
| JP | 2003-326407 A | 11/2003 |
| JP | 2004-090181 A | 3/2004 |
| JP | 2004-255560 A | 9/2004 |
| JP | 2005-034974 A | 2/2005 |
| JP | 2010-023178 A | 2/2010 |
| JP | 2014-195851 A | 10/2014 |
| JP | 6322351 B1 | 5/2018 |
| WO | WO-02/00390 A1 * | 1/2002 |

OTHER PUBLICATIONS

Machine Translation of EP 1386691 A1, which EP '691 was published Feb. 2004.*
International Search Report issued in Patent Application No. PCT/JP2018/017388 dated Aug. 7, 2018.

* cited by examiner

[FIG.1]
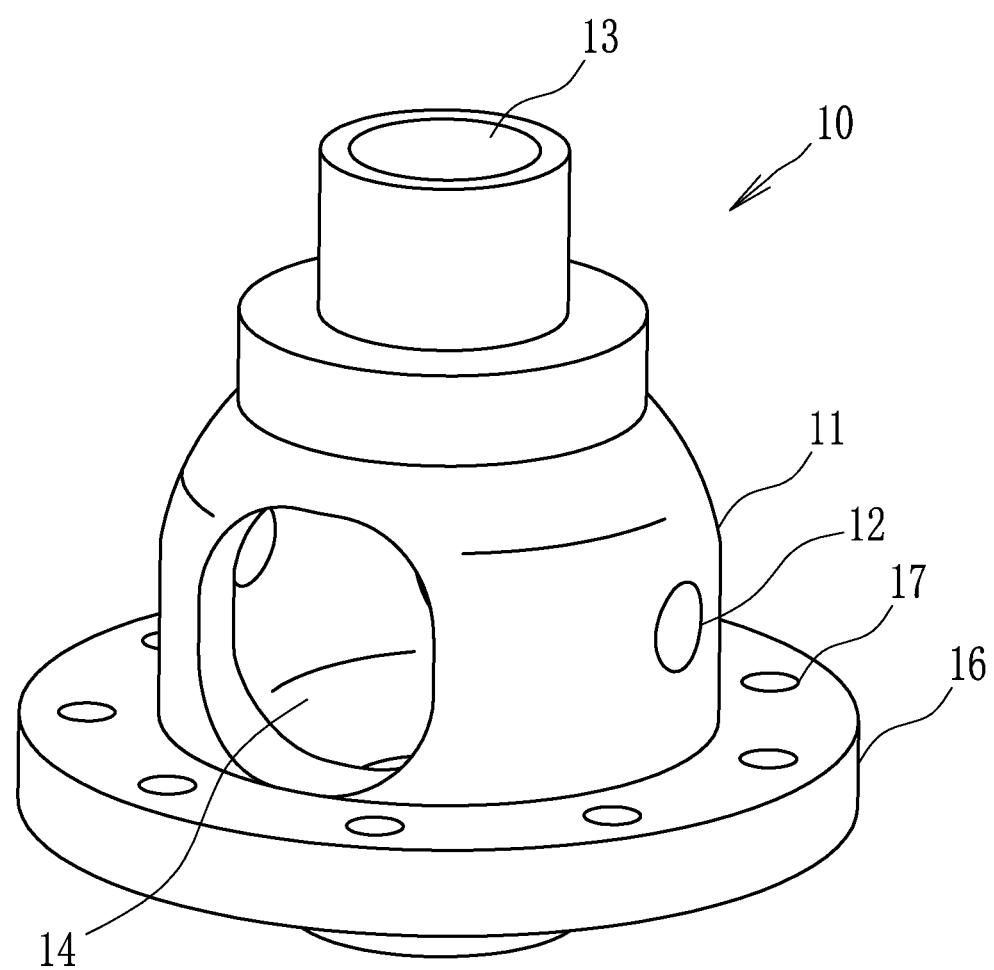

[FIG.2]
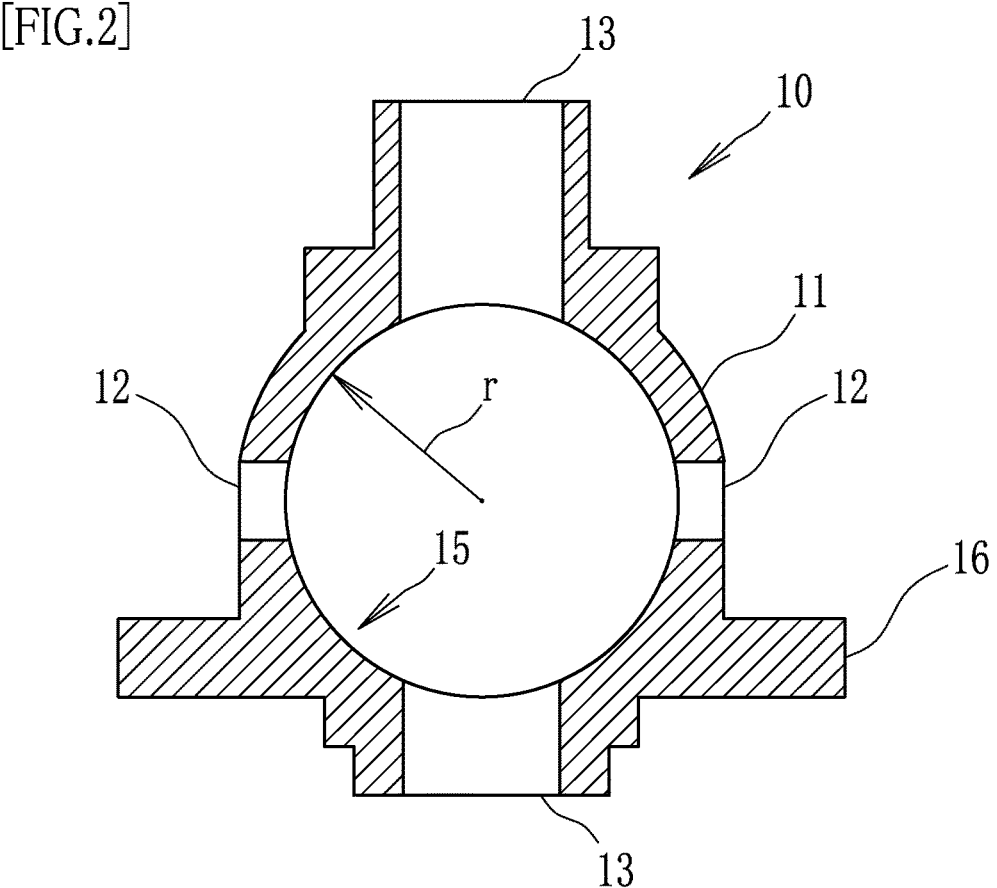
[FIG.3]
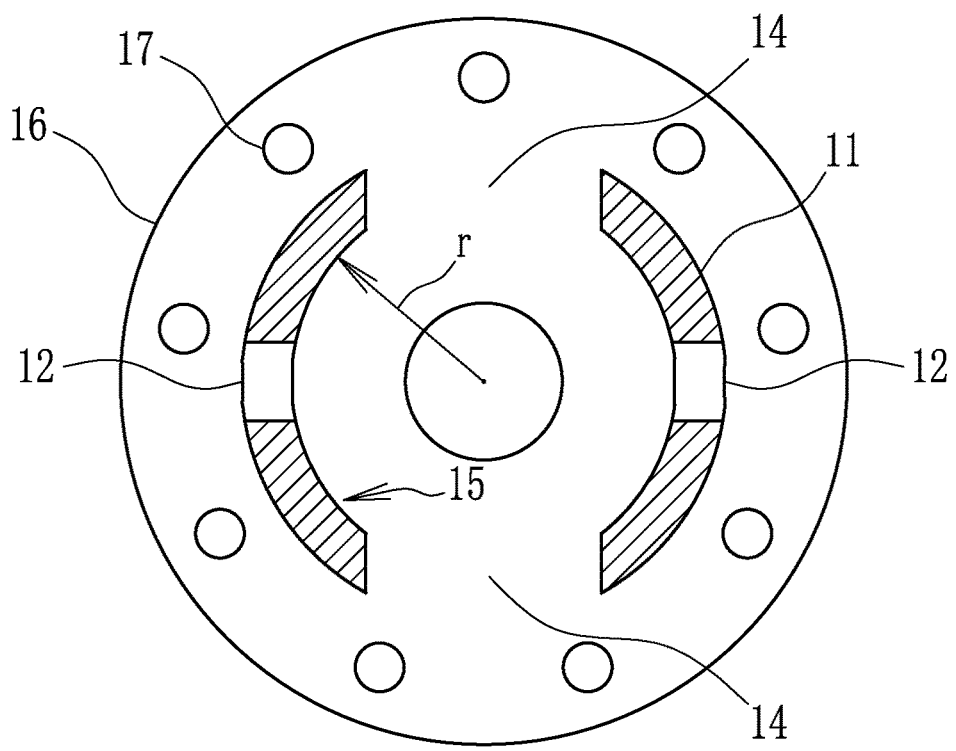

[FIG.4]
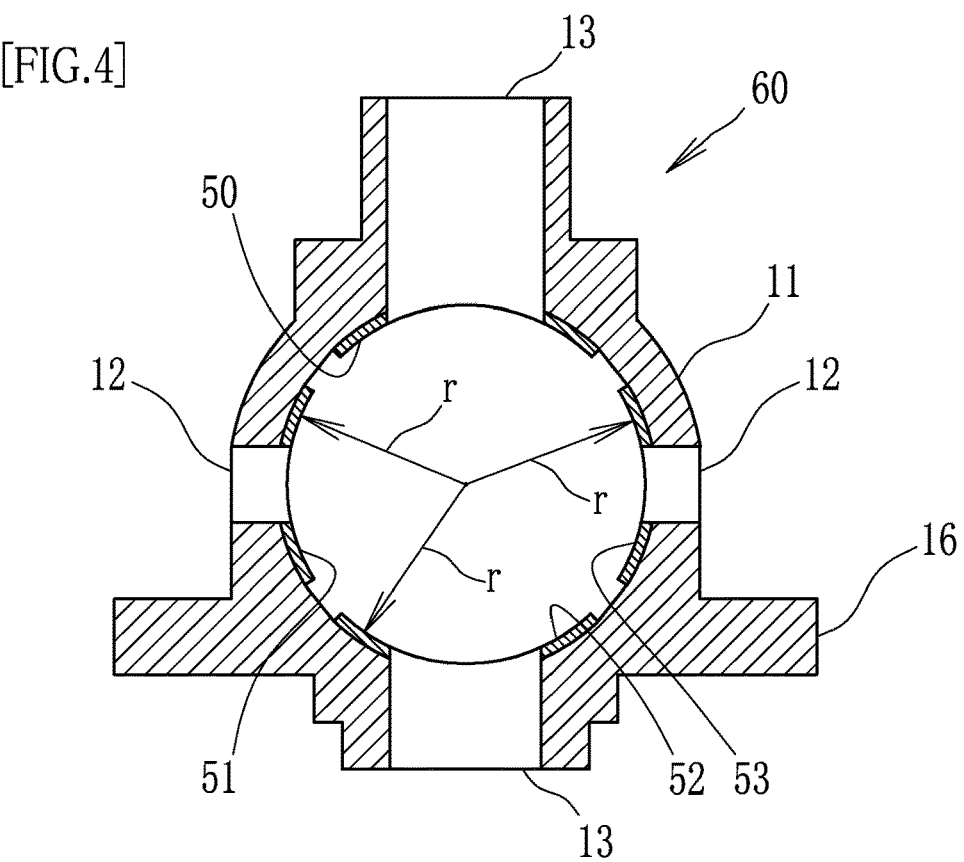
[FIG.5]
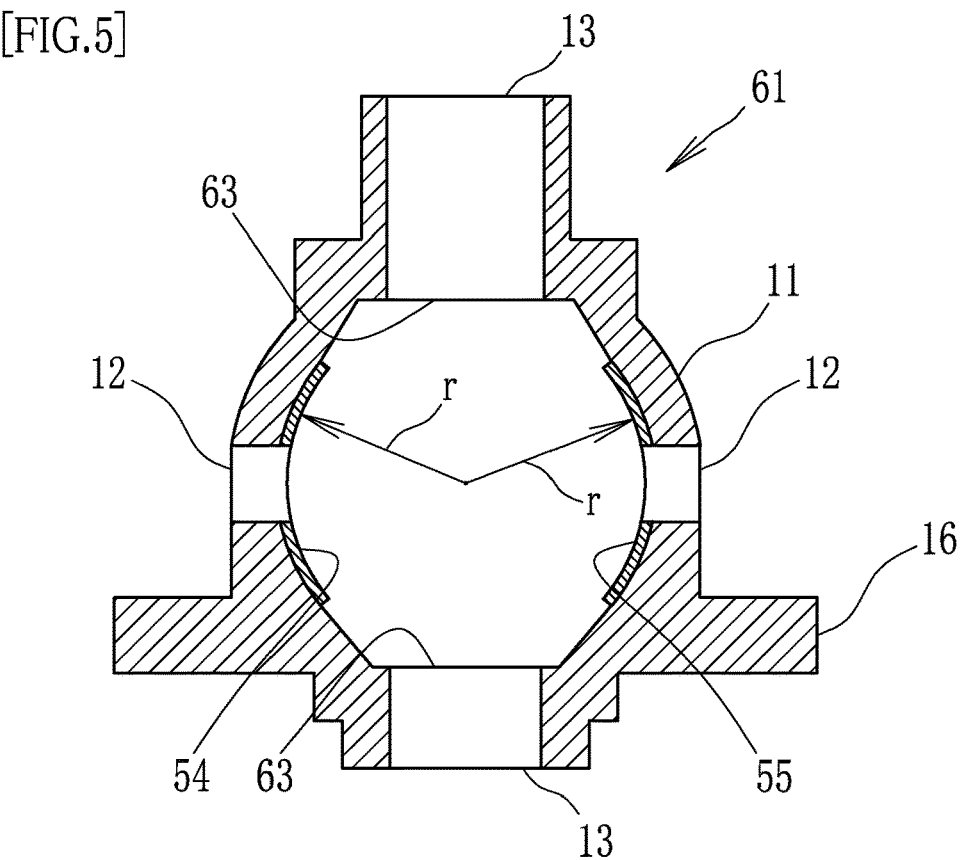

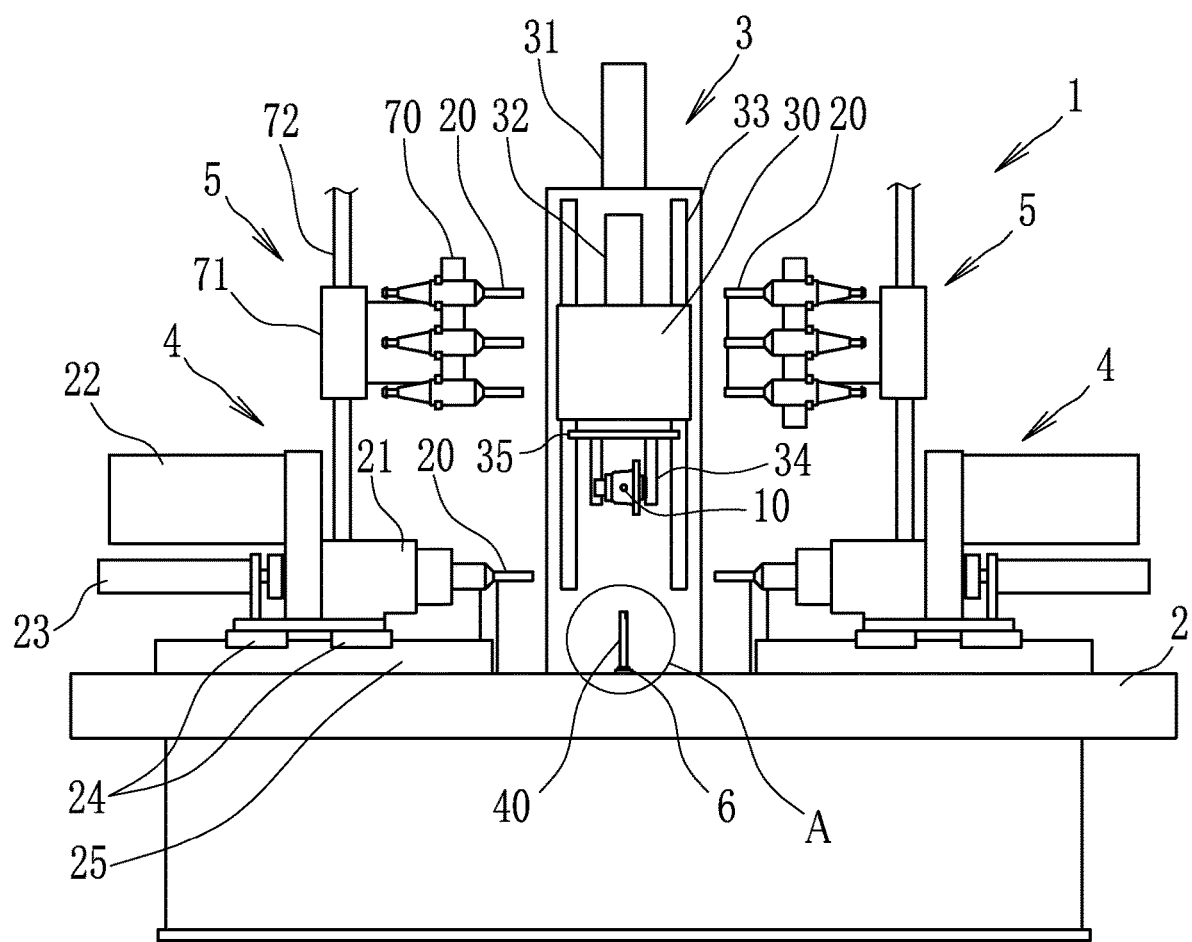
[FIG.6]

[FIG.7]
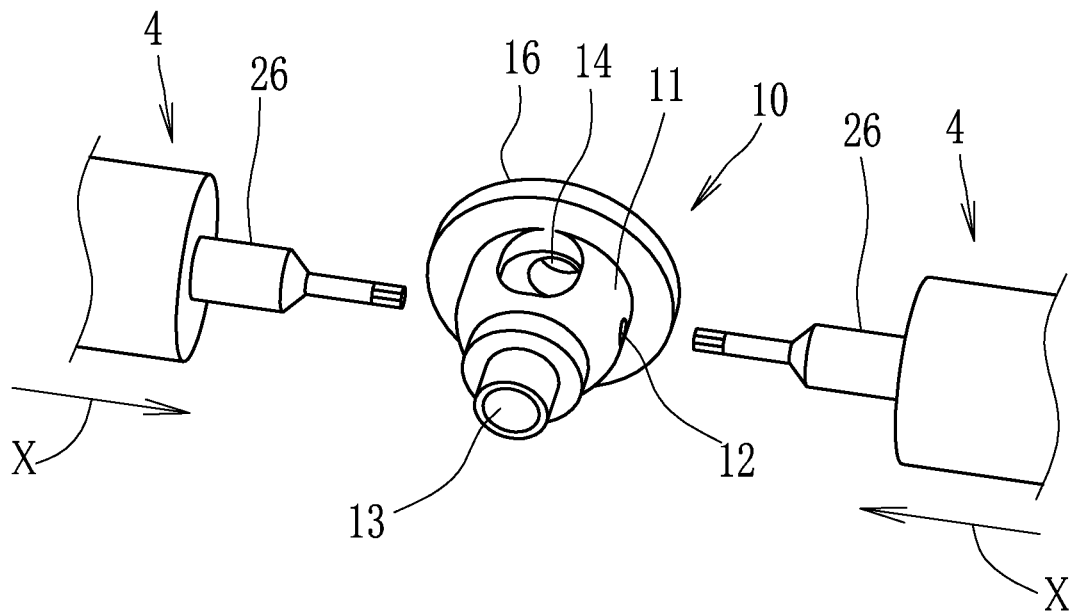
[FIG.8]
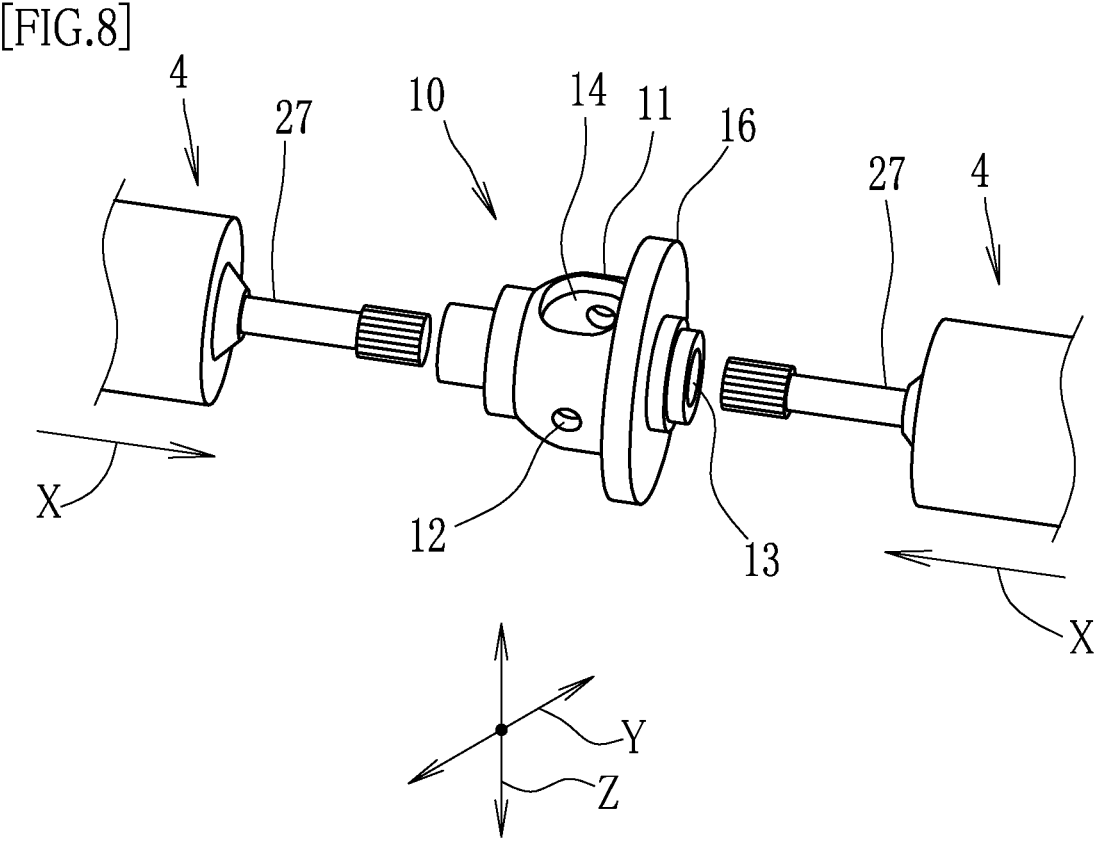

[FIG.9]
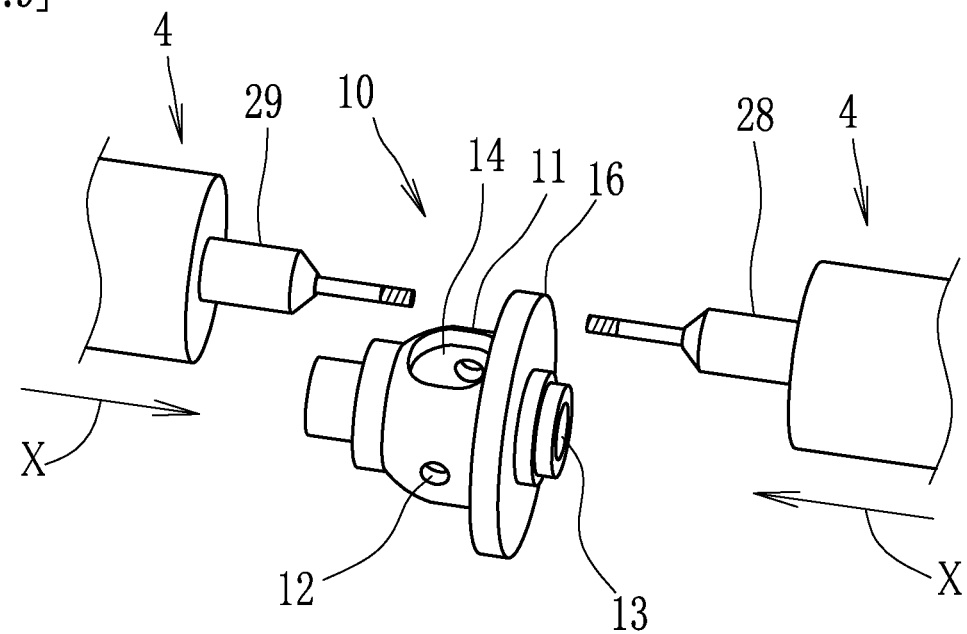
[FIG.10]
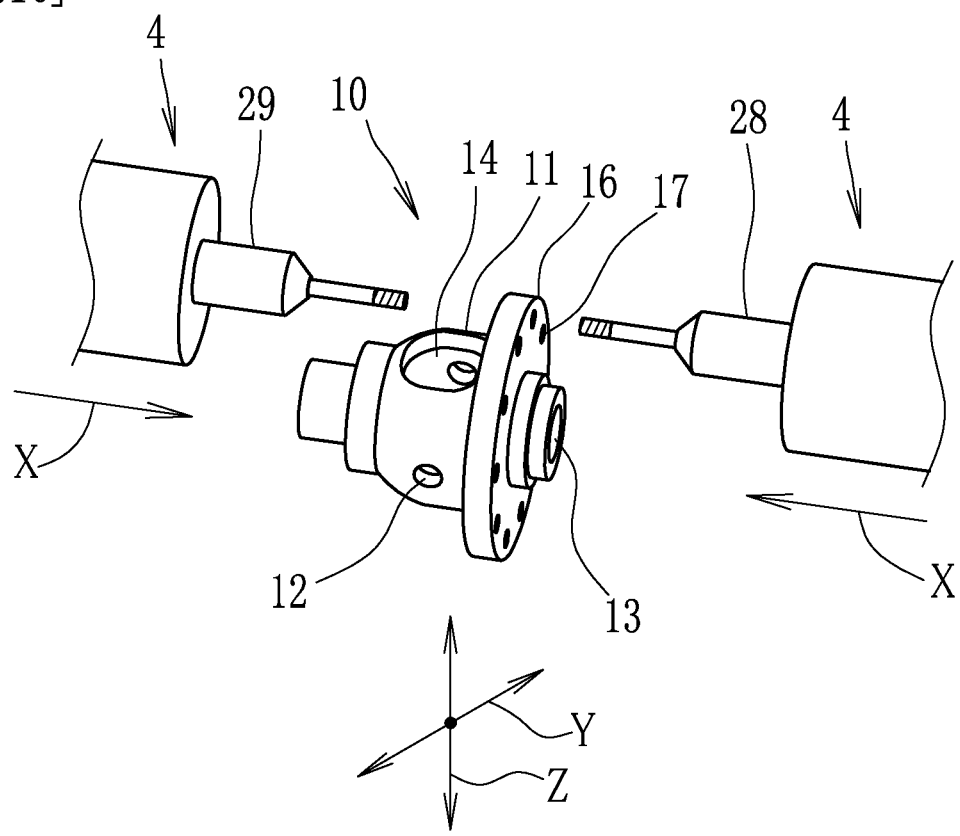

[FIG.11]
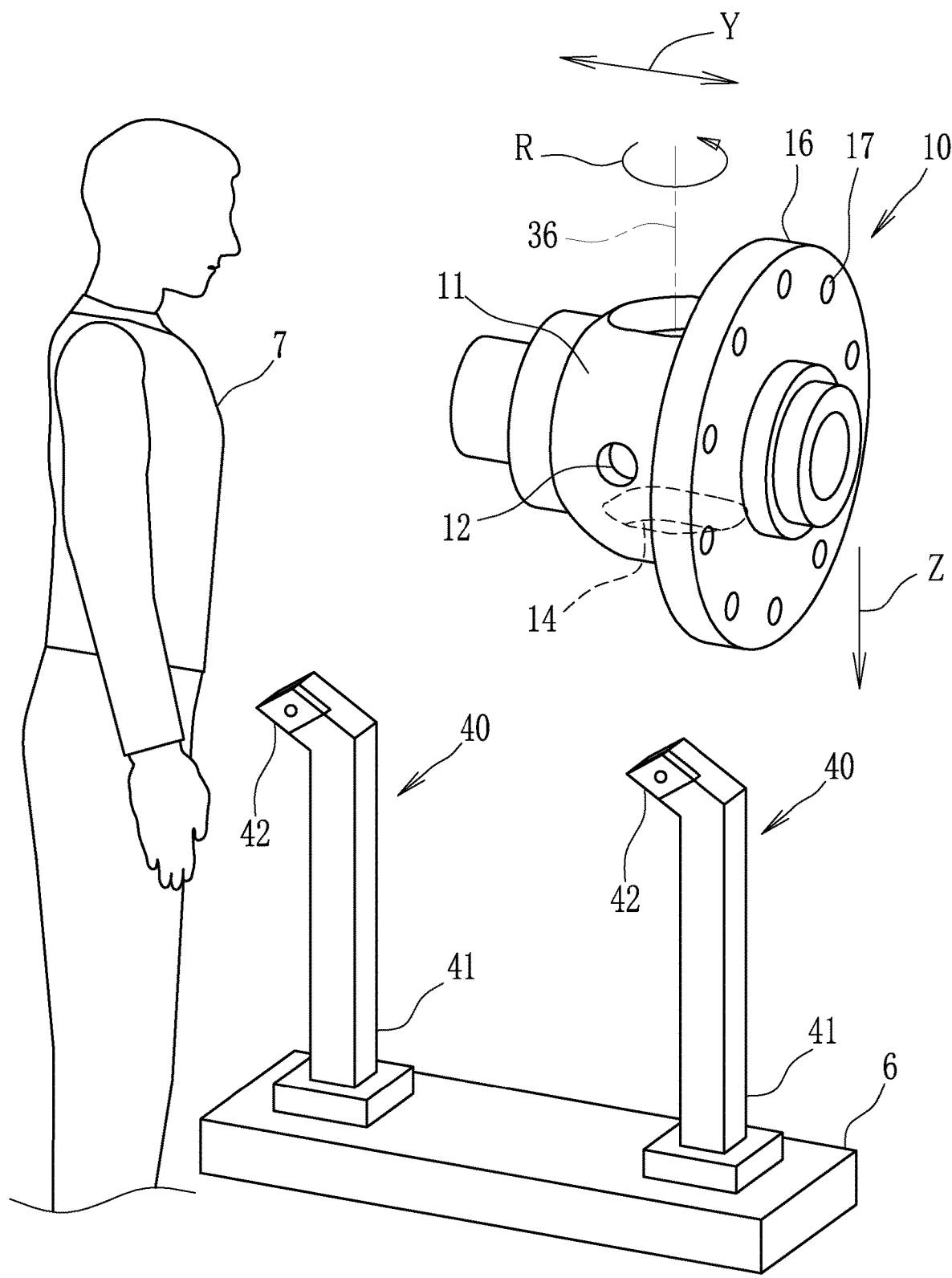

[FIG.12]
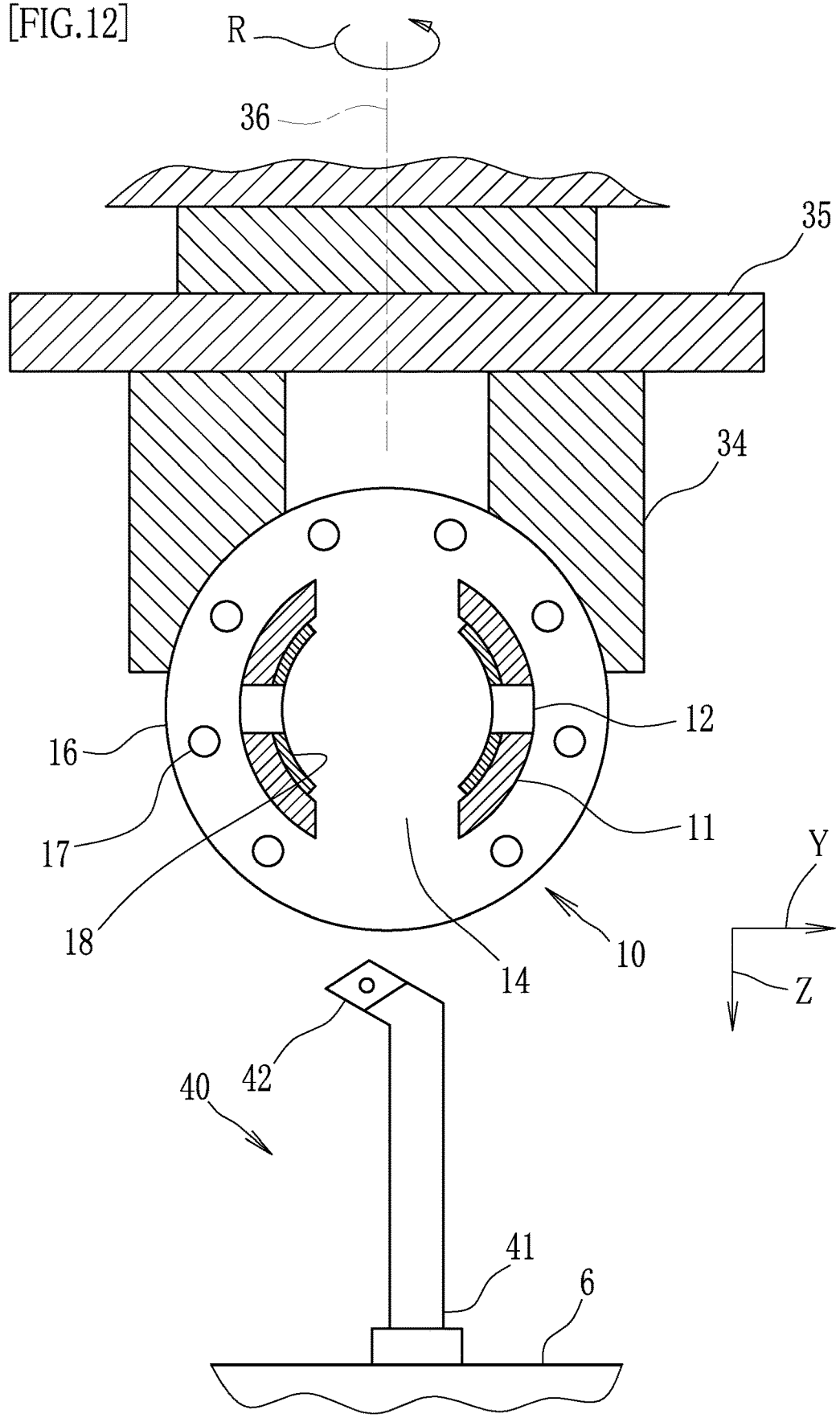

[FIG.13]
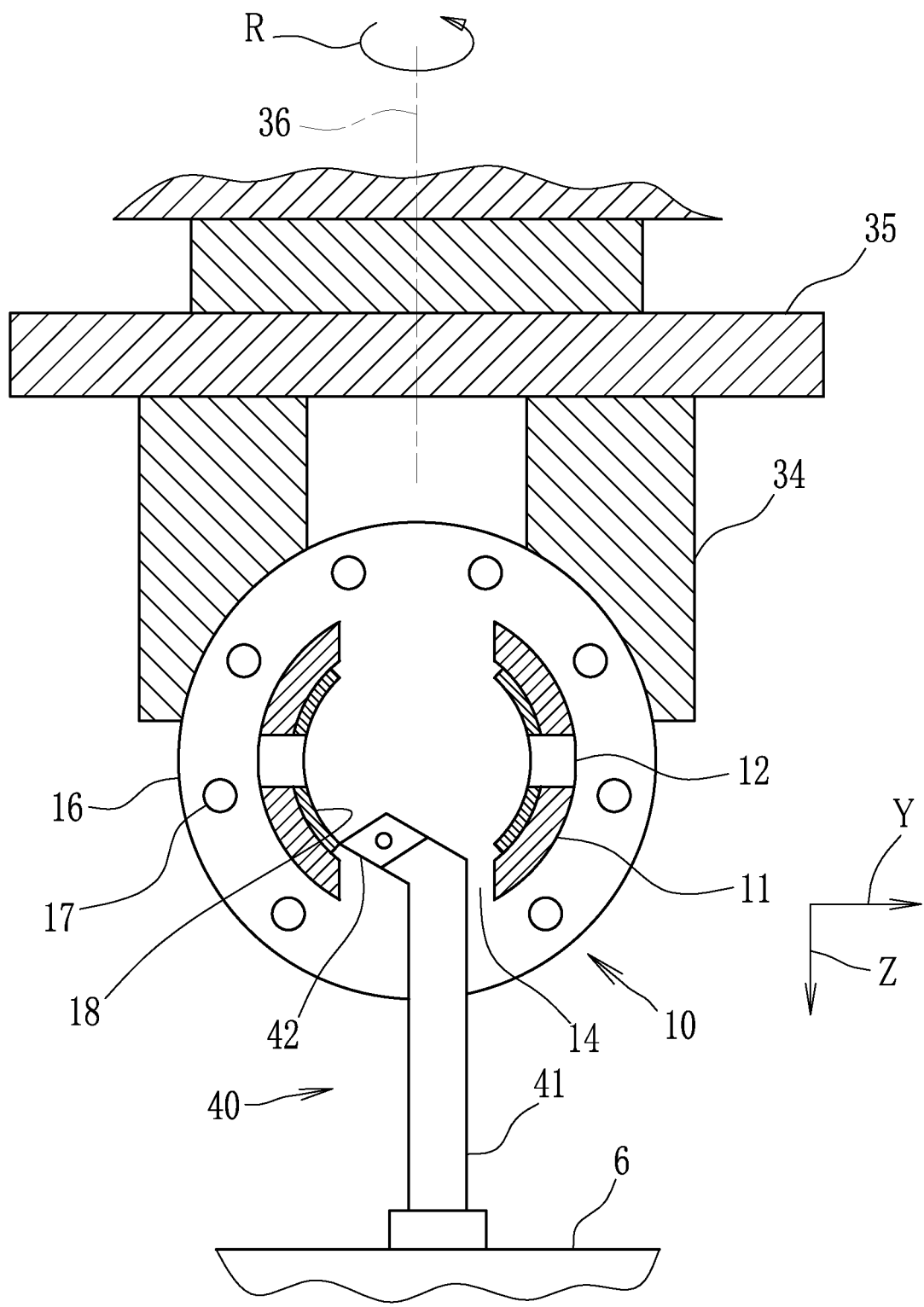

[FIG.14]
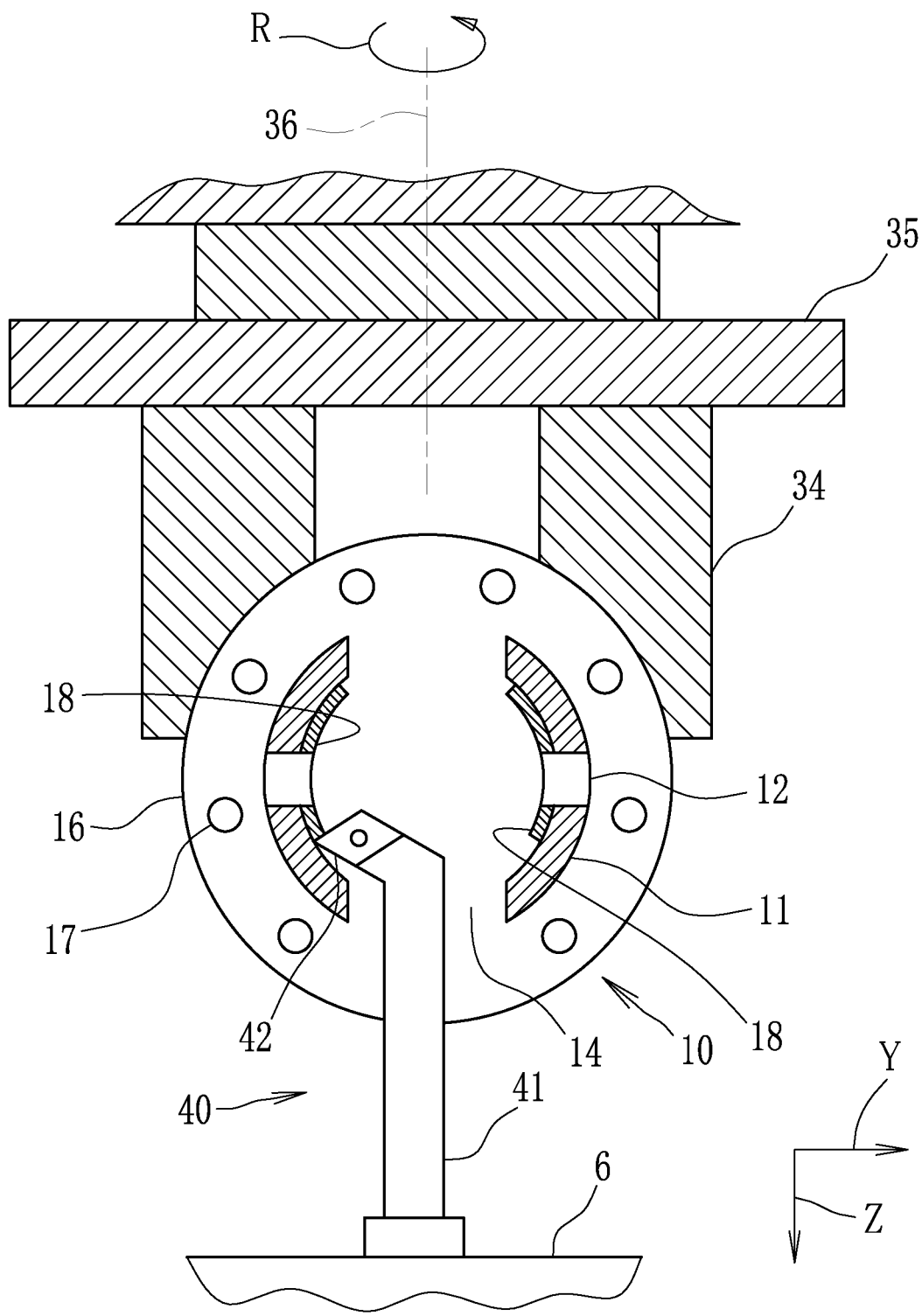

[FIG.15]
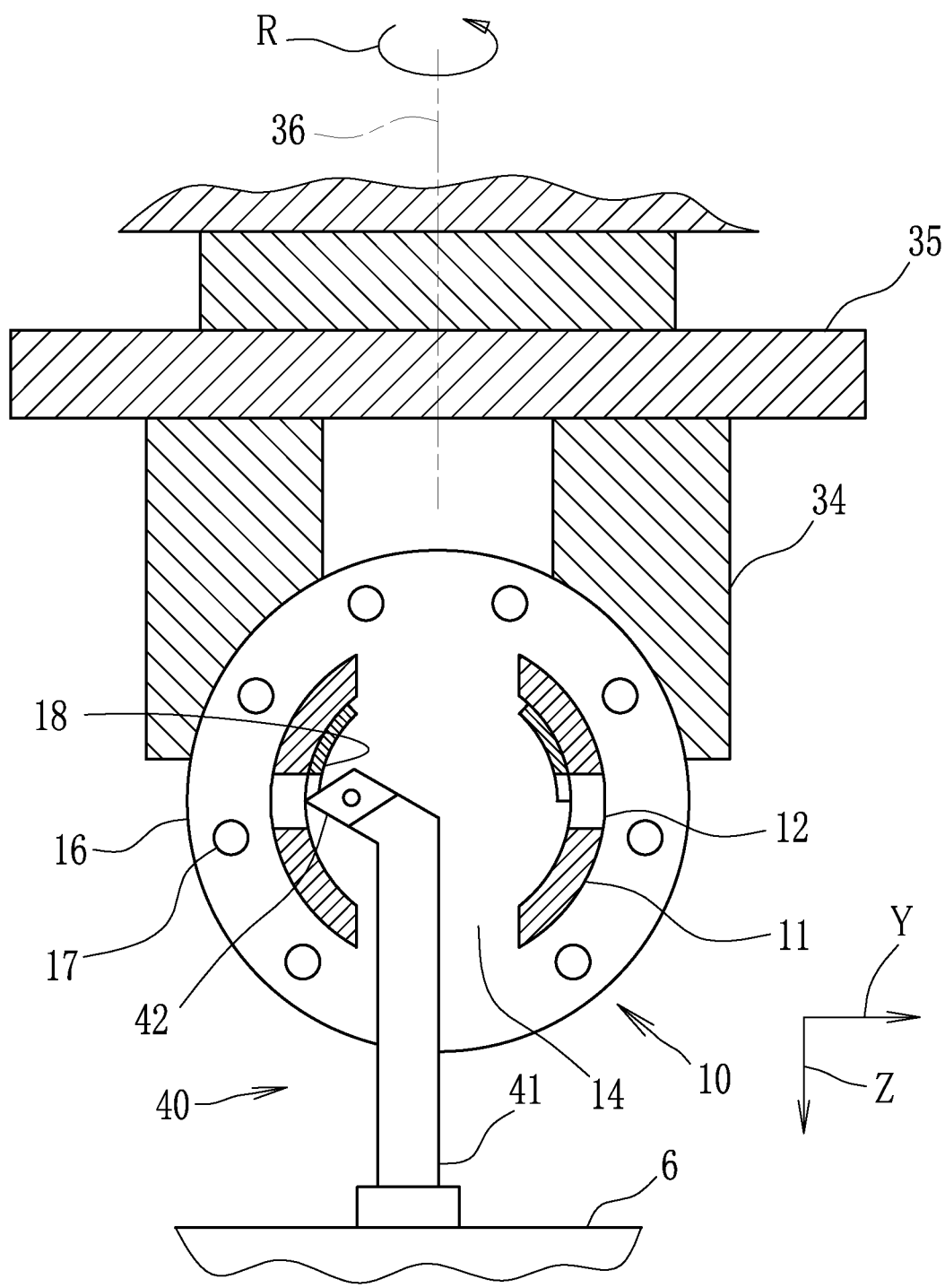

[FIG.16]
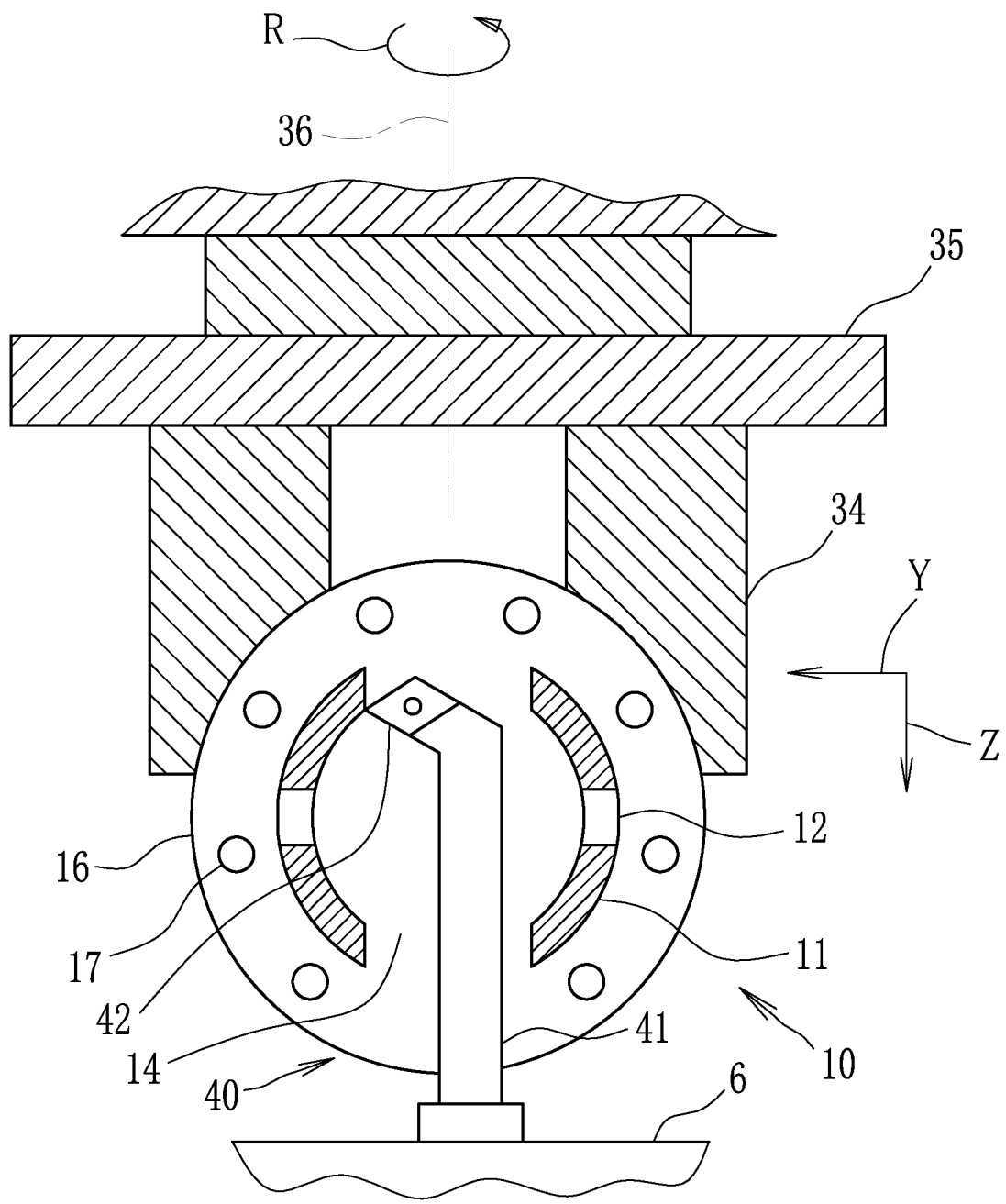

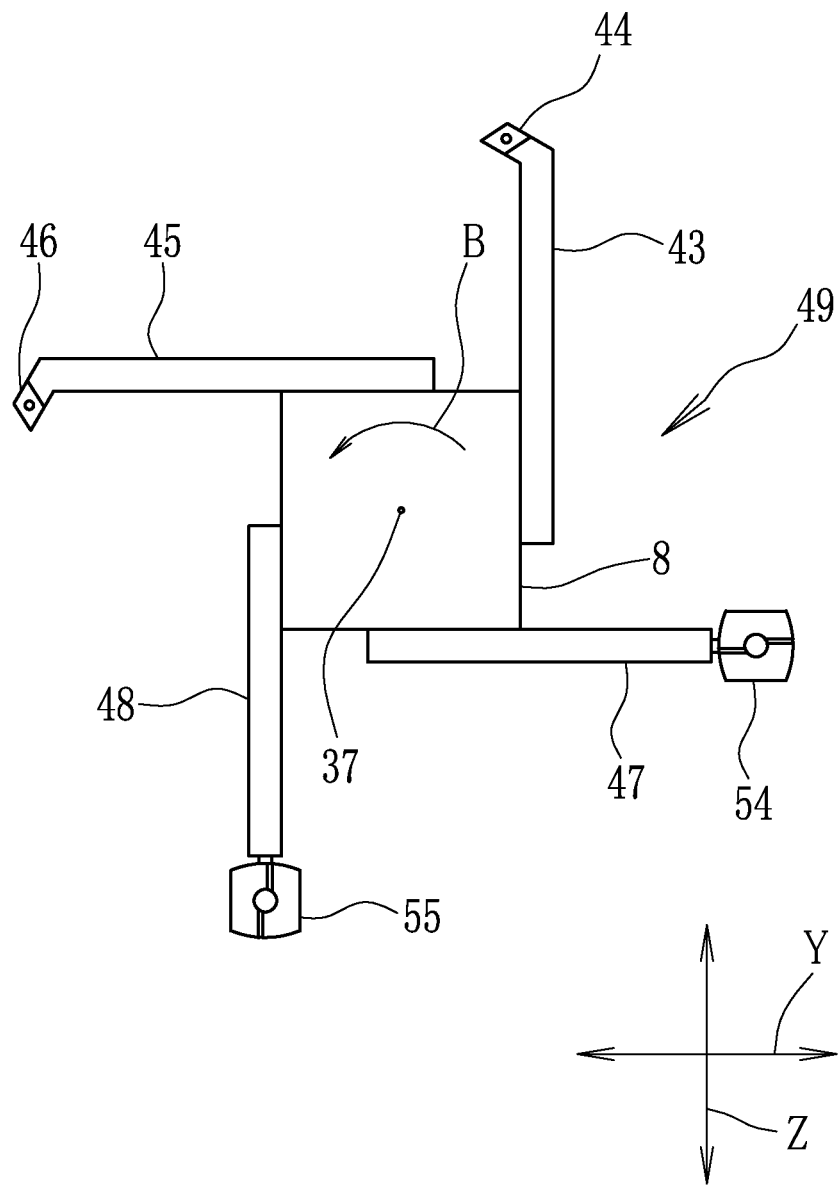
[FIG.17]

[FIG.18]
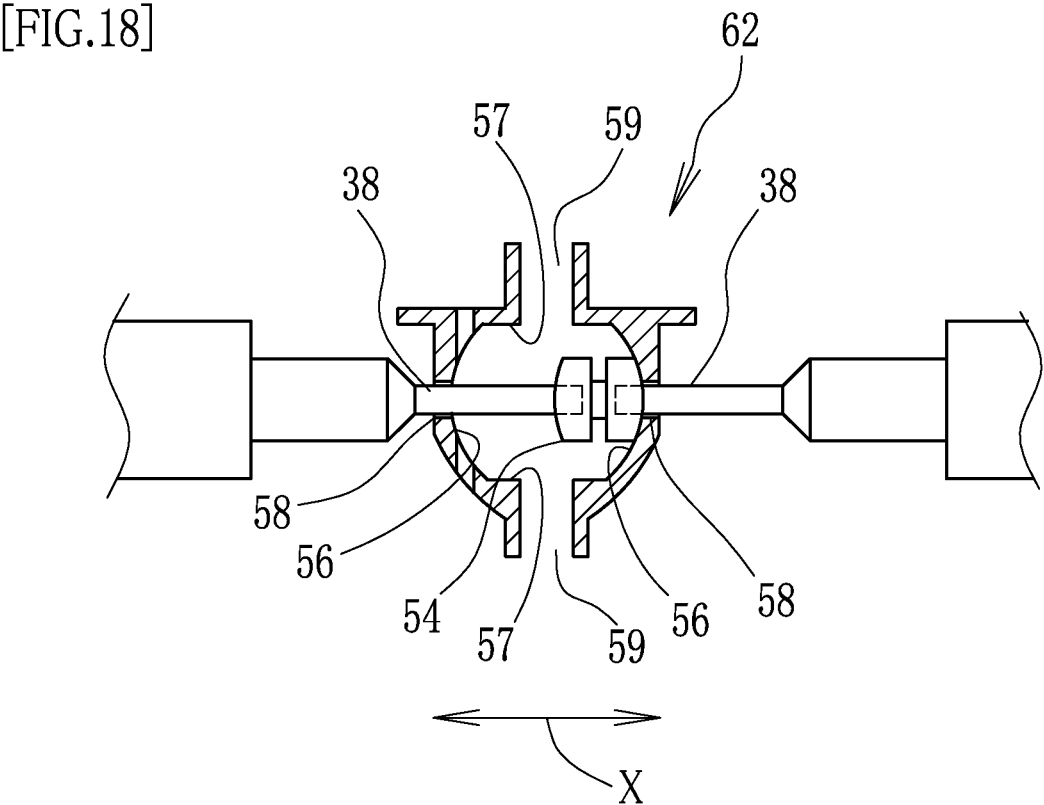
[FIG.19]
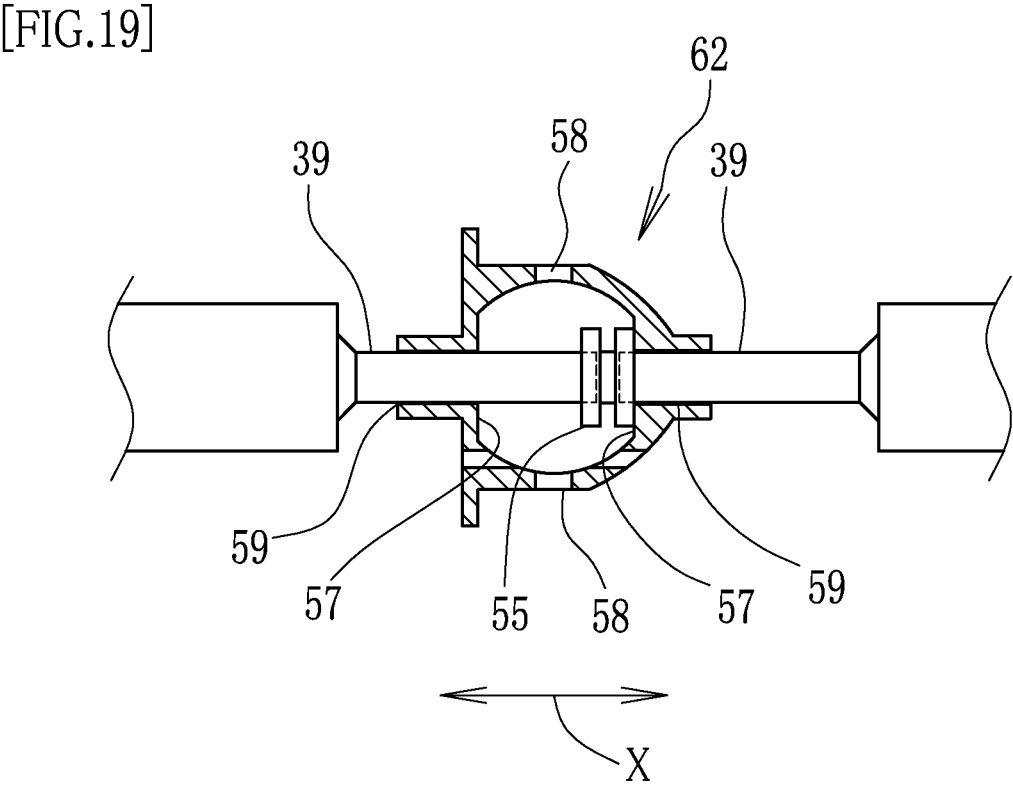

FIG. 20

Alternative Where a Robot Delivers the Cutter to the Tool Attached To Each of the Machining Units 4

MACHINING APPARATUS FOR DIFFERENTIAL CASE

TECHNICAL FIELD

The present disclosure relates to a machining apparatus for a differential case (differential gear case) and relates to a machining apparatus for a differential case that not only spherically cuts an inner surface but also performs a variety of machining operations of a differential case.

BACKGROUND

A variety of machining apparatuses that cut a differential case have been known. For example, in a jig for workpiece machining described in Patent Literature 1, a differential case is supported on a mount to be rotated by a motor, thereby making it possible to cut a spherical inner surface of the differential case with a cutting tool (machining tool). More specifically, while the mount where the differential case is set is rotated, the NC-controlled cutting tool is brought into contact with a lower end of a surface to be machined of the inner surface of the differential case. The cutting tool is then moved in an arc from a lower end portion of the surface to be machined to an upper end portion thereof to perform cutting.

Meanwhile, Patent Literature 2 proposes a machining apparatus for a differential case, the machining apparatus including a shuttle unit rotatable and slidable in front and back directions, an inner surface machining cutting tool changing apparatus that slides in up and down directions, and a pair of right and left machining units opposed to each other with a workpiece in between, the machining apparatus enabling, without impairing versatility irrespective of a simple structure, machining of a different area of a differential case.

CITATION LIST

Patent Literature

Patent Literature 1: Japanese Utility Model Laid-open No. 63-120701
Patent Literature 2: Japanese Patent Application Laid-open No. 2014-195851

SUMMARY

Technical Problem

Inner surface machining of a differential case includes end surface machining, in which a tool is rotated to machine cut an end surface near a hole while a workpiece is fixed, and whole sphere machining, in which a spherical surface or the like of an inner surface of a workpiece is spherically cut while the workpiece is rotated at a high speed. The jig for workpiece machining described in Patent Literature 1 enables whole sphere machining of a differential case but is a dedicated device for this machining operation, so that in performing shaft hole machining and end surface machining, the differential case has to be transferred to other dedicated devices for performing these machining operations.

In contrast, the machining apparatus for a differential case described in Patent Literature 2 enables machining a different area of a differential case by itself as described above, but the shuttle unit of this machining apparatus is rotated merely for positioning and thus cannot cause a differential case to rotate at a high speed. For this reason, this machining apparatus cannot perform whole sphere machining of a differential case.

The present disclosure is intended to solve a conventional problem as described above and an object thereof is to provide a universal machining apparatus for a differential case that enables, without impairing versatility irrespective of a simple structure, machining of a different area of a differential case in addition to whole sphere machining and end surface machining by itself.

Solution to Problem

To achieve the above-described object, a machining apparatus for a differential case according to the present disclosure includes: a shuttle unit that holds a differential case and rotates the differential case; a pair of opposed right and left machining units; and a tool support that supports a tool for machining the differential case, in which the pair of right and left machining units each include a slide mechanism dedicated for uniaxial sliding in right and left directions, the shuttle unit is movable in up and down directions and front and back directions, a tool attached to each of the pair of right and left machining units enables machining an end portion of an inner surface of the differential case and a flange hole of the differential case, the end portion surrounding a through hole, and a cutting edge of the tool supported by the tool support enables spherically cutting the inner surface of the differential case held and rotated by the shuttle unit.

This configuration allows the shuttle unit holding the differential case to rotate the differential case while being movable in the up and down directions and the front and back directions, thus enabling whole sphere machining of the inner surface of the differential case, and allows respective slide mechanisms of the pair of right and left machining units to slide in the right and left directions, thus enabling the end surface machining of the inner surface of the differential case with the tool attached to each of the machining units. In addition to this, the shuttle unit holding the differential case is movable in the up and down directions and the front and back directions, thus enabling machining of the flange hole arranged along a circumference of a flange of the differential case even though the slide mechanisms of the machining units are dedicated for uniaxial sliding in the right and left directions and also enabling machining of a different area of the differential case. That is, according to the present disclosure, while preventing an apparatus from being complicated and increased in size, it is possible to perform, without impairing versatility irrespective of a simple structure, machining of a different area of the differential case, such as a side gear hole, in addition to whole sphere machining and end surface machining by the single apparatus.

In the machining apparatus for a differential case according to the present disclosure, it is preferable that a cutter to be attached to the tool of each of the machining units be delivered by a robot. Further, it is preferable that the tool support be rotatable and attachable with the tool to be attached to each of the machining units. These configurations can make it easy to replace the tool and can increase types of tools usable for machining.

Advantageous Effects of Invention

The advantageous effects of the present disclosure are as above and may be summarized by saying that whole sphere machining of the inner surface of a rotated differential case is made possible, machining of flange holes arranged along a circumference of a flange of the differential case is also made possible in addition to the end surface machining of the inner surface of the differential case with a tool attached to each of the machining units, and, further, machining of a different area of the differential case is made possible, thus while preventing an apparatus from being complicated and increased in size, enabling, without impairing versatility irrespective of a simple structure, machining of a different area of the differential case, such as the flange holes, in addition to whole sphere machining and end surface machining by the single apparatus.

BRIEF DESCRIPTION OF THE DRAWINGS

FIG. 1 is a perspective view of a workpiece that is an object to be machined by a machining apparatus for a differential case according to one embodiment of the present disclosure;

FIG. 2 is a vertical cross-sectional view of the workpiece illustrated in FIG. 1;

FIG. 3 is a horizontal cross-sectional view of the workpiece illustrated in FIG. 1;

FIG. 4 is a vertical cross-sectional view of another example of the workpiece that is the object to be machined by the machining apparatus for a differential case according to one embodiment of the present disclosure;

FIG. 5 is a vertical cross-sectional view of still another example of the workpiece that is the object to be machined by the machining apparatus for a differential case according to one embodiment of the present disclosure;

FIG. 6 is a front view of the machining apparatus for a differential case according to one embodiment of the present disclosure;

FIG. 7 is a perspective view illustrating that a pair of shaft holes are being machined in the machining apparatus for a differential case according to one embodiment of the present disclosure;

FIG. 8 is a perspective view illustrating a state of a differential case rotated around a longitudinal center axis by 90 degrees from a state in FIG. 7;

FIG. 9 is a perspective view illustrating a state of the workpiece moved downward integrally with an elevating body from the state in FIG. 8;

FIG. 10 is a perspective view illustrating a state where boring and tapping of flange holes have been completed around an entire circumference of a flange from the state in FIG. 9;

FIG. 11 is a perspective view illustrating a relevant portion of the machining apparatus illustrated in FIG. 6 in a state immediately before a tool is put into an opening of the workpiece;

FIG. 12 is a cross-sectional view illustrating a relevant portion in a state where the workpiece is set in the machining apparatus in one embodiment of the present disclosure;

FIG. 13 is a cross-sectional view illustrating the relevant portion in a state where machining of the workpiece is started in one embodiment of the present disclosure;

FIG. 14 is a cross-sectional view illustrating the relevant portion in a state where the machining of the workpiece progresses in one embodiment of the present disclosure;

FIG. 15 is a cross-sectional view illustrating the relevant portion in a state where the machining of the workpiece further progresses in one embodiment of the present disclosure;

FIG. 16 is a cross-sectional view illustrating the relevant portion in a state where the machining of the workpiece has been completed in one embodiment of the present disclosure;

FIG. 17 is a front view of a tool changer according to one embodiment of the present disclosure;

FIG. 18 illustrates a state where a cutter is sandwiched between a pair of tools attached to machining units in one embodiment of the present disclosure;

FIG. 19 illustrates a state where another cutter is sandwiched between the pair of tools attached to the machining units in one embodiment of the present disclosure and FIG. 20 schematically shows a feature of the present invention.

DETAILED DESCRIPTION OF THE EMBODIMENTS

Description is made below on one embodiment of the present disclosure with reference to the drawing. First, description is made on a workpiece 10, which is an object to be machined, with reference to FIGS. 1 to 3. The workpiece 10 is a differential case, that is, a built-in case for a differential transmission mechanism. FIG. 1 is a perspective view of the workpiece 10, FIG. 2 is a vertical cross-sectional view of the workpiece 10 illustrated in FIG. 1, and FIG. 3 is a horizontal cross-sectional view of the workpiece 10 illustrated in FIG. 1. FIGS. 1 to 3 each illustrate the workpiece 10 having been machined, shaft holes 12 and flange holes 17 of which are to be subjected to machining such as boring with a tool attached to each of machining units 4 of a machining apparatus 1 for a differential case illustrated in FIG. 6.

In FIG. 1, a flange 16 is formed surrounding a side surface of a cylindrical portion 11 and the plurality of flange holes 17 are formed in the flange 16. In FIG. 2, the shaft holes 12, that is, a pair of through holes, are formed in the side surface of the cylindrical portion 11 and axle holes 13, that is, a pair of through holes, are formed in top and bottom of the cylindrical portion 11. Further, in FIG. 3, a pair of window-shaped openings 14 are formed in the side surface of the cylindrical portion 11. An inner surface 15 of the workpiece 10 is in the form of a spherical surface with a radius r.

In the workpiece 10 according to the present embodiment, the inner surface 15 is in the form of a spherical surface as a whole. The workpiece 10 is not limited to this and independent four surfaces, namely, a surface 50, a surface 51, a surface 52, and a surface 53, may be in the form of a spherical surface or in a form close to a spherical surface as in a workpiece 60 illustrated in FIG. 4. Further, as in a workpiece 61 illustrated in FIG. 5, two independent surfaces, namely, a surface 54 and a surface 55, may be in the form of a spherical surface or in a form close to a spherical surface. Although exaggeratedly illustrated in the form of projections in FIG. 4 and FIG. 5 for the convenience of explanation, the surface 50 to the surface 55 are each actually a surface continuous with the other surfaces. The spherical surface or the like of any of the workpiece 10, the workpiece 60, and the workpiece 61 can be spherically machined while the workpiece is rotated at a high speed with a cutting edge being in contact with the spherical surface or the like. In the present embodiment, spherically cutting a spherical surface or the like of an inner surface of a workpiece while rotating the workpiece at a high speed is referred to as whole sphere machining.

Further, the inner surface machining of the workpiece may include spherically machining, within the inner surface of the workpiece, only an end surface 56 near each of shaft holes 58 as in FIG. 18 or machining, within the inner surface of the workpiece, an end surface 57 (flat surface portion) defined near each of axle holes 59 as in FIG. 19. In the present embodiment, cutting an end surface of an inner surface of a workpiece by rotating a tool while fixing the workpiece is referred to as end surface machining. As described later, end surface machining is a separate process using a dedicated tool different from that of the whole sphere machining.

Description is made below on the machining apparatus 1 for a differential case according to one embodiment of the present disclosure. First, a configuration of the machining apparatus 1 is schematically described with reference to FIG. 6. FIG. 6 is a front view of the machining apparatus 1 for a differential case according to one embodiment of the present disclosure. In FIG. 6, a shuttle unit 3, the machining units 4, an ATC (automatic tool changing apparatus) 5, and a tool support 6 are mounted on a base 2.

The shuttle unit 3 can hold a differential case and rotate it. The shuttle unit 3 includes an elevating body 30 and is movable integrally with it in Y-directions (front and back directions). Rotation of a ball screw 32 caused by a motor 31 makes it possible to the elevating body 30 to move along a guide 33 in Z-directions (up and down directions). The elevating body 30 includes a clamper 34 that holds the workpiece 10 and a rotary mount 35 that rotates the clamper 34. This configuration causes the workpiece 10 to rotate integrally with the rotary mount 35 while being held by the clamper 34. The shuttle unit 3 enables the rotary mount 35 to perform two types of rotation: a low-speed rotation for positioning of the workpiece 10 (approximately 10 rpm) and a high-speed rotation for the whole sphere machining of the workpiece 10 (for example, 400 to 600 rpm).

More specifically, the shuttle unit 3 can move the workpiece 10 in the Y-directions (front and back directions) and the Z-directions (up and down directions) while rotating the workpiece 10 at a high speed, thus allowing for not only the positioning of the workpiece 10 but also the later-described whole sphere machining. It is also possible to continuously circularly move the workpiece 10 or move the workpiece 10 along a contour of each area thereof by continuously moving the workpiece 10 in the Y-directions (front and back directions) and the Z-directions (up and down directions) with the rotation of the workpiece 10 stopped, thereby allowing for later-described contouring and deburring.

Further, it is possible to sequentially machine a different area of the workpiece 10 by moving the workpiece 10 in the Y-directions (front and back directions) and the Z-directions (up and down directions) every time when machining of each area of the workpiece 10 is completed, thereby allowing for machining of a different area of the workpiece 10, such as later-described flange holes.

A tool 40 is fixed to the tool support 6. The tool 40 includes a cutting edge for cutting the spherical inner surface of the workpiece 10. Machining of the workpiece 10 with the tool 40 is performed while the workpiece 10 is moved with the tool 40 fixed. The tool 40 and the machining of the workpiece 10 using it will be described later in detail.

The machining units 4, which are a right and left pair, are opposed to each other, allowing the workpiece 10 moved downward from a position of FIG. 6 to be sandwiched therebetween. A tool 20 is attached to a distal end of each of the machining units 4. In the present embodiment, tools 20 can be selectively used in accordance with an area to be machined and the tool 20 attached to each of the machining units 4 is automatically replaced with necessary one of the tools 20 by the ATC 5.

The ATC 5 includes a rotating disk 70 and the plurality of tools 20 are removably attached to the rotating disk 70. The elevating body 71 is guided by a guide shaft 72, allowing the ATC 5 to vertically move. To replace the tool 20, the elevating body 71 is moved downward and the tool 20 attached to the distal end of each of the machining units 4 is replaced with the tool 20 attached to the rotating disk 70 of the ATC 5.

The machining units 4 each include a housing 21, a motor for tool drive 22, and a motor for sliding 23. A driving force of the motor for tool drive 22 is transferred to a driving force transfer mechanism (not illustrated), causing the tool 20 to rotate. A driving force of the motor for sliding 23 is transferred to a ball screw mechanism (not illustrated). This causes each of the machining units 4 to slide and reciprocate in X-axis directions (right and left directions). More specifically, a slider 24, which is integral with each of the machining units 4, slides along a guide rail 25.

The machining of the workpiece 10 by the machining apparatus 1 is specifically described below. FIG. 7 is a perspective view illustrating that the pair of shaft holes 12 penetrating through both sides of the cylindrical portion 11 of the workpiece 10 are being machined. A tool 26 for machining the shaft holes 12 is attached to each of the machining units 4 in advance by the ATC 5 (FIG. 6).

As illustrated in FIG. 6, the workpiece 10 is held by the clamper 34 when attached to the machining apparatus 1, and in performing machining by the machining units 4, the shuttle unit 3 is moved in the front and back directions (Y-directions) and the elevating body 30 is moved downward (Z-directions) until a position where a center of each of the shaft holes 12 of the workpiece 10 is in alignment with a center of the tool 26 is reached as illustrated in FIG. 7.

The machining units 4 are each horizontally moved (X-directions) toward the shaft hole 12 from the state in FIG. 7, putting a distal end of the tool 26 into the shaft hole 12, and an inner circumferential surface of the shaft hole 12 is machined by rotation of the tool 26. When the machining is completed, the machining units 4 are each horizontally moved to recede toward an original position.

In the machining apparatus 1 according to the present embodiment, the elevating body 30 with the workpiece 10 rotatably held by the clamper 34 in FIG. 6 is movable in the up and down directions (Z-directions) and the shuttle unit 3 including the elevating body 30 is movable in the front and back directions (Y-directions) as described above. That is, the workpiece 10 is rotatable and movable in both the up and down directions (Z-directions) and the front and back directions (Y-directions). Therefore, the machining units 4, which are dedicated for uniaxial sliding in the right and left directions (X-directions), enable machining of a variety of areas of the workpiece 10.

Specifically, 90-degree rotation of the workpiece 10 around a longitudinal center axis from the state in FIG. 7 causes the distal ends of the machining units 4 to face the respective axle holes 13 while causing a flat portion of the flange 16 to face a distal end side of each of the machining units 4. FIG. 8 illustrates this state. In the state of this figure, the tool attached to each of the machining units 4 has been replaced with a tool 27 for the axle holes 13 by the ATC 5 (FIG. 6) and a distal end of the tool 27 is put into the axle hole 13 to machine the inner circumferential surface of the axle hole 13 by rotation of the tool 27.

FIG. 9 illustrates a state where the workpiece 10 is moved downward integrally with the elevating body 30 (FIG. 6) from the state in FIG. 8. In this state, the tool attached to one of the machining units 4 has been replaced with a tool 28 for boring flange holes by the ATC 5 (FIG. 6) and the tool attached to the other machining unit 4 has been replaced with a tool 29 for tapping flange holes, the tool 28 for boring and the tool 29 for tapping both facing the flange 16. The machining unit 4 attached with the tool 28 for boring is moved toward the flange 16 and this movement is continued even after the tool 28 for boring comes into contact with the flange 16, thereby boring the flange holes 17 (FIG. 10) in the flange 16 with the rotated tool 28 for boring.

After one of the flange holes 17 is bored in the flange 16, the machining unit 4 attached with the tool 29 for tapping is moved toward the flange 16 and this movement is continued even after a distal end of the tool 29 for tapping comes into contact with the flange hole 17, thereby tapping the flange hole 17 with the rotated tool 29 for tapping.

FIG. 10 illustrates a state where boring and tapping of the flange holes 17 have been completed around an entire circumference of the flange 16. According to the present embodiment, after the completion of the boring of each of the flange holes 17, the flange hole 17 can be directly tapped while keeping the workpiece 10 held without the necessity of replacing the tool, thus allowing for performing flange hole machining with a high accuracy and in a short time.

The workpiece 10 is movable integrally with the shuttle unit 3 in the up and down directions (Z-directions) and the front and back directions (Y-directions) as described above. Thus, although the machining units 4 are dedicated for uniaxial sliding in the right and left directions (X-directions), the movement of the workpiece 10 allows the distal end of the tool attached to each of the machining units 4 to face any position within the flange 16, performing boring and tapping of the flange holes 17 around the entire circumference of the flange 16.

The workpiece 10 is rotated and, if necessary, the shuttle unit 3 and the elevating body 30 thereof are moved as in the flange hole machining, thereby making it possible to machine other areas of the workpiece 10, such as a dowel hole, a side gear hole, and a differential lock hole.

Further, since the workpiece 10 is movable in both the up and down directions (Z-directions) and the front and back directions (Y-directions), each area of the workpiece 10 can be circularly moved. Thus, with an endmill attached to the machining unit 4, contouring of the shaft holes 12 and the axle holes 13 is made possible. Likewise, with the endmill attached to the machining unit 4, contouring of a spirally formed oil groove is made possible by circularly moving the workpiece 10.

Further, since the workpiece 10 is movable in both the up and down directions (Z-directions) and the front and back directions (Y-directions), it is also possible to not only circularly move each area of the workpiece 10 but also move the workpiece 10 along a contour of each area thereof. By causing such a movement, deburring of the openings 14 (see FIG. 1) of the workpiece 10 and the like is made possible. Thus, deburring is concentrated in the machining apparatus 1, eliminating the necessity of the use of a dedicated apparatus for deburring.

FIG. 11 is a perspective view illustrating a relevant portion of the machining apparatus 1 illustrated in FIG. 6 in a state immediately before the tool 40 is put into the opening 14 of the workpiece 10. An operator 7 is illustrated for the convenience of defining front and back but a scale thereof is not accurate. In FIG. 11, the tool 40 includes a shank 41 and a cutting edge 42 fixed thereto. The tool 40 is fixed to the tool support 6.

Regarding the two tools 40 illustrated in FIG. 11, the different cutting edges 42 may be used, making one of the tools 40 intended for roughing cut and the other tool 40 intended for finishing. Although the two tools 40 are illustrated in FIG. 11, the single tool 40 may be provided or two or more may be arranged in a comb form. In addition, the tools 40 may be removably attachable to the tool support 6, allowing the tools 40 to be replaced in accordance with the content of machining.

In FIG. 11, in performing the whole sphere machining of the workpiece 10, the shuttle unit 3 (see FIG. 6) is moved in the front and back directions (Y-directions), positioning the openings 14 of the workpiece 10 with respect to the tool 40. Subsequently, the elevating body 30 (see FIG. 6) is moved downward, putting the tool 40 into the workpiece 10.

Description is made below on the whole sphere machining of the workpiece 10 with the tool 40. As illustrated in FIG. 6, the rotary mount 35 is attached to the elevating body 30, the clamper 34 is attached to the rotary mount 35, and the workpiece 10 is held by the clamper 34. FIG. 12 is a cross-sectional view illustrating a relevant portion of the workpiece 10 in a state set in the machining apparatus 1. The workpiece 10, the clamper 34, and the rotary mount 35 are simplistically illustrated in a cross-sectional state. Although the workpiece 10 is identical to the workpiece 10 illustrated in FIG. 1 to FIG. 3, a cutting allowance 18 of the inner surface of the workpiece 10 is exaggeratedly illustrated in the form of projections for the convenience of explanation of cutting. These illustrations also apply to FIG. 13 and those subsequent thereto.

When the rotary mount 35 is rotated around a center axis 36 thereof, the workpiece 10 is rotated integrally with it (see an arrow R). In a state in FIG. 12, the workpiece 10 is rotated around the center axis 36 integrally with the rotary mount 35 and the workpiece 10 is in a standby state for whole sphere machining. The rotation of the workpiece 10 is a high-speed rotation for whole sphere machining, a rotational frequency of which is, for example, 400 to 600 rpm as described above.

Description is made below on the whole sphere machining of the workpiece 10 in order of steps. FIG. 13 is a cross-sectional view illustrating the relevant portion in a state where the machining of the workpiece 10 is started. In this figure, which illustrates a state where the workpiece 10 is moved downward (Z-direction) and moved backward (Y-direction) from the state in FIG. 12, the cutting edge 42 of the tool 40 enters the cylindrical portion 11 of the workpiece 10 and the cutting edge 42 is in contact with the cutting allowance 18 of the workpiece 10. With the workpiece 10 moved downward (Z-direction) and moved backward (Y-directions) from this state, the cutting edge 42 comes into contact along the inner surface of the rotated workpiece 10, thus spherically cutting the cutting allowance 18.

FIG. 14 is a cross-sectional view illustrating a state where the whole sphere machining of the workpiece 10 progresses from the state in FIG. 13. In the state of this figure, the workpiece 10 is moved backward (Y-direction) while moved downward (Z-direction) from the state in FIG. 13. This causes the cutting of the cutting allowance 18 to progress with a part of the cutting allowance 18 spherically cut. FIG. 15 is a cross-sectional view illustrating the relevant portion in a state where the whole sphere machining of the workpiece 10 further progresses. In the state of this figure, the workpiece 10 is moved backward (Y-direction) while moved downward (Z-direction) from the state in FIG. 14. This causes the cutting of the cutting allowance 18 to progress with approximately half of the cutting allowance 18 spherically cut.

FIG. 16 is a cross-sectional view illustrating the relevant portion in a state where the whole sphere machining of the workpiece 10 has been completed. In the state of this figure, the workpiece 10 is moved forward (Y-direction) while moved downward (Z-direction) from the state in FIG. 15. This completes the cutting of the cutting allowance 18 with the whole of the inner surface of the workpiece 10 spherically cut.

While the whole sphere machining of the inner surface of the workpiece has been described above, end surface machining is not necessary for an object such as the workpiece 10 with an inner surface in the form of a spherical surface as a whole, since the whole of the inner surface is machined by whole sphere machining. Further, end surface machining is also not necessary for an object such as the workpiece 60 illustrated in FIG. 4 with the surface 50 to the surface 53 near the shaft holes 12 and near the axle holes 13 each being in the form of a spherical surface, since these surfaces are machined by whole sphere machining. In contrast, as in the workpiece 61 illustrated in FIG. 5, without interference of the cutting edge, surfaces 63 near the axle holes 13 are each in the form of a flat surface while the surface 54 and the surface 55 can be machined by whole sphere machining, making end surface machining additionally necessary for machining the surfaces 63.

In contrast, areas of the workpiece 62 illustrated in FIG. 18 requiring the inner surface machining include the end surface 56 near each of the shaft holes 58 and the flat end surface 57 near each of the axle holes 59. In this case, end surface machining is necessary instead of whole sphere machining. With a cutter further attached to the tool attached to each of the machining units 4, the machining apparatus 1 according to the present embodiment also enables the end surface machining of an inner surface of a workpiece.

FIG. 17 is a front view of one example of a tool changer for attaching a cutter to a tool attached to each of the machining units 4. A tool changer 49 illustrated in this figure is to be used in place of the tool 40 and the tool support 6 of the machining apparatus 1 illustrated in an A-portion in FIG. 6. The tool changer 49 includes a tool support 8 and a tool 43, a tool 45, a tool 47, and a tool 48 fixed thereto. The tool 43 and the tool 45 include a cutting edge 44 and a cutting edge 46, respectively, and a cutter 54 and a cutter 55 are removably attached to the tool 47 and the tool 48, respectively.

Similarly to the tool 40 (see FIG. 11), the tool 43 and the tool 45 are intended for whole sphere machining: the tool 43 is usable for roughing cut and the tool 45 is usable for finishing. The cutter 54 attached to the tool 47 is intended for cutting an end surface into a spherical surface and the cutter 55 attached to the tool 48 is intended for cutting a flat end surface. The tool support 8 is rotatable around a center 37 (a direction of an arrow B) and movable in the up and down directions (Z-directions).

In machining a workpiece with the tool 43, the tool support 8 is rotated to set the tool 43 upright as in FIG. 17. The same applies to a case where a workpiece is to be machined with the tool 45. An operation after the tool 43 or the tool 45 is set upright is similar to that in the case regarding the tool 40 described with reference to FIG. 12 to FIG. 16.

In a case of using the cutter 54, after the tool 47 is set upright by rotating the tool support 8, the tool support 8 is moved upward (Z-direction), putting the cutter 54 into a workpiece. Next, the cutter 54 is sandwiched between a pair of tools 38 (see FIG. 18) attached to the machining units 4 and then the tool support 8 is moved downward (Z-direction), thereby separating the tool 47 from the cutter 54.

FIG. 18 illustrates a state where the cutter 54 is sandwiched between the pair of tools 38 attached to the machining units 4. In this state, the tool 47 (see FIG. 17) is separated from the cutter 54. The workpiece 62 illustrated in this figure, which has a different inner surface shape that of the workpiece 10 illustrated in FIG. 1 to FIG. 3, does not require whole sphere machining but requires end surface machining for machining the end surface 56 near each of the shaft holes 58 into a spherical surface and end surface machining for machining the end surface 57 near each of the axle holes 59 into a flat surface. FIG. 18 illustrates that one of the end surfaces 56 near the pair of shaft holes 58 is being machined and the other end surface 56 can be machined by horizontally (X-direction) moving each of the machining units 4.

A case of using the cutter 55 (see FIG. 17) is similar to the case of using the cutter 54 and FIG. 19 illustrates a state where the cutter 55 is sandwiched between a pair of tools 39 attached to the machining units 4. In this state, the tool 48 (see FIG. 17) is separated from the cutter 55. The workpiece 62 illustrated in FIG. 19 is rotated by 90 degrees from the state in FIG. 18 and this figure illustrates that the end surface 57 near one of the axle holes 59 is being machined.

Although an example where the tool changer 49 is used to attach the tool for end surface machining to the tool attached to each of the machining units 4 has been described in the above-described embodiment, this configuration is not limitative but a robot (schematically depicted in FIG. 20) may be used to deliver the cutter to the tool attached to each of the machining units 4.

While one embodiment of the present disclosure has been described above, according to the present disclosure, the shuttle unit that holds a differential case can rotate the differential case while being movable in the up and down directions and the front and back directions, thus enabling whole sphere machining of an inner surface of the differential case, and respective slide mechanisms of the pair of right and left machining units slide in the right and left directions, thus enabling the end surface machining of the inner surface of the differential case with the tool attached to each of the machining units. In addition to this, the shuttle unit that holds the differential case is movable in the up and down directions and the front and back directions, thus enabling machining of flange holes arranged along a circumference of a flange of the differential case even though the slide mechanisms of the machining units are dedicated for uniaxial sliding in the right and left directions and also enabling machining of a different area of the differential case. That is, according to the present disclosure, while preventing an apparatus from being complicated and increased in size, it is possible to perform, without impairing versatility irrespective of a simple structure, machining of a different area of the differential case, such as flange holes, in addition to whole sphere machining and end surface machining by the single apparatus.

REFERENCE SIGNS LIST 1 machining apparatus
3 shuttle unit
4 machining unit
5 ATC
6, 8 tool support 10, 60, 61, 62 workpiece (differential case)
14 opening
17 flange hole
30 elevating body
40, 43, 45, 47, 48 tool
42, 44, 46 cutting edge

What is claimed is:

1. A machining apparatus for a differential case, the machining apparatus comprising:
   a shuttle unit that holds the differential case and rotates the differential case;
   a right machining unit and a left machining unit; and
   a tool support that supports a first tool for machining the differential case, wherein
   the first tool is configured to machine an inner surface of the differential case while the first tool is supported by the tool support,
   the right machining unit includes a first slide mechanism dedicated for uniaxially sliding in right and left directions, and the left machining unit includes a second slide mechanism dedicated for uniaxial sliding in the right and left directions,
   the shuttle unit comprises an elevating body configured to move in up and down directions and the elevating body holds the differential case, the shuttle unit comprising the elevating body being configured to move in front and back directions,
   the elevating body includes a rotary mount that is configured to hold the differential case and rotate the differential case,
   each of the right machining unit and the left machining unit comprises a second tool, respectively, configured to machine a flange hole of the differential case, or each of the right machining unit and the left machining unit comprises a third tool, respectively, configured to sandwich and hold a cutter between the third tool of the right machining unit and the third tool of the left machining unit, the cutter being configured to machine an end portion surrounding a through hole of the inner surface of the differential case, and
   a cutting edge of the first tool supported by the tool support is configured to spherically cut the inner surface of the differential case that is held by the rotary mount and rotated integrally with the rotary mount while the first tool is supported by the tool support.

2. The machining apparatus for the differential case according to claim 1, wherein the cutter is delivered by a robot.

3. The machining apparatus for the differential case according to claim 1, wherein the tool support is rotatable and is configured to sandwich the cutter between the third tool of the right machining unit and the third tool of the left machining unit.

4. The machining apparatus for the differential case according to claim 1, wherein the right machining unit comprises:
   a first motor configured to drive the corresponding second tool or the corresponding third tool; and
   a second motor configured to slide the right machining unit, and the left machining unit comprises:
   a third motor configured to drive the corresponding second tool or the corresponding third tool; and
   a fourth motor configured to slide the left machining unit.

5. The machining apparatus for the differential case according to claim 1, when the right machining unit and the left machining unit machine the flange hole of the differential case, the second tool of the right machining unit is a tool for boring and the second tool of the left machining unit is a tool for tapping.

6. The machining apparatus for the differential case according to claim 1, wherein
   when the cutting edge of the first tool spherically cuts the inner surface of the differential case, the shuttle unit moves the differential case in the front and back directions and the up and down directions relative to the cutting edge of the first tool while the shuttle unit rotates the differential case about an axis along the up and down directions.

7. The machining apparatus for the differential case according to claim 1, wherein the shuttle unit rotates the differential case at a rotational speed of 400 to 600 rpm.

8. The machining apparatus for the differential case according to claim 1, wherein the first tool extends in a direction perpendicular to a direction in which the right machining unit and the left machining units uniaxially slide.

9. The machining apparatus for the differential case according to claim 1, wherein the first tool is fixed on the tool support, and the first tool does not move while the cutting edge of the first tool spherically cuts the inner surface of the differential case.

* * * * *